(12) United States Patent
Marks

(10) Patent No.: US 7,156,918 B2
(45) Date of Patent: Jan. 2, 2007

(54) WEIGHING DEVICES

(76) Inventor: Peter John Marks, Flat 2, 24 Foote Street, Albert Park, Victoria 3206 (AU)

( * ) Notice: Subject to any disclaimer, the term of this patent is extended or adjusted under 35 U.S.C. 154(b) by 0 days.

(21) Appl. No.: 10/515,214

(22) PCT Filed: May 23, 2003

(86) PCT No.: PCT/AU03/00632

§ 371 (c)(1),
(2), (4) Date: May 20, 2005

(87) PCT Pub. No.: WO03/100360

PCT Pub. Date: Dec. 4, 2003

(65) Prior Publication Data

US 2005/0224261 A1  Oct. 13, 2005

(30) Foreign Application Priority Data

May 23, 2002  (AU) .................................. PS2521

(51) Int. Cl.
G01G 19/52  (2006.01)
G01G 19/58  (2006.01)
G01G 23/20  (2006.01)
G01G 3/00  (2006.01)
G01G 3/14  (2006.01)

(52) U.S. Cl. .............. 117/168; 177/169; 177/225; 177/245; 190/115; 116/215; 116/280; 116/DIG. 32; 73/862.621; 224/600; 224/627

(58) Field of Classification Search ................ 177/131, 177/148–149, 244–245, 168–169, 225; 190/115; 116/215, 280, DIG. 32; 73/862.621; 224/600, 224/627

See application file for complete search history.

(56) References Cited

U.S. PATENT DOCUMENTS

| 2,518,973 | A | * | 8/1950 | Atherton | 190/102 |
| 2,710,083 | A | * | 6/1955 | White | 190/102 |
| 2,759,577 | A | | 8/1956 | White | |
| 2,937,016 | A | * | 5/1960 | Westman | 177/156 |
| 3,090,454 | A | * | 5/1963 | Farrar et al. | 177/131 |
| 4,936,495 | A | * | 6/1990 | Van de Pol | 224/627 |
| 5,319,162 | A | * | 6/1994 | Ness | 177/231 |
| 5,416,279 | A | * | 5/1995 | Tseng | 177/132 |
| 5,852,258 | A | * | 12/1998 | Tribou | 177/126 |
| 6,092,574 | A | * | 7/2000 | Krulik | 150/110 |
| 2005/0051586 | A1 | * | 3/2005 | Siwak et al. | |
| 2005/0217903 | A1 | * | 10/2005 | Roberts et al. | |
| 2005/0217904 | A1 | * | 10/2005 | Hughes | |
| 2006/0054364 | A1 | * | 3/2006 | Kamakau | |

FOREIGN PATENT DOCUMENTS

DE  20210055 U1  10/2002

(Continued)

*Primary Examiner*—Randy W. Gibson
(74) *Attorney, Agent, or Firm*—Stites & Harbison PLLC; Ross F. Hunt, Jr.

(57) ABSTRACT

A weighing device (10) for providing a indication of the weight of a piece of luggage (5), the device comprising load bearing means (11) adapted to be placed on or form part of the carry means of the piece of luggage (H) and indicator means (19) associated with the load bearing means whereby when the luggage is lifted by the carry means (H), the load bearing means is subjected to the mass of the piece of luggage and the indicator means provides an indication of the weight of the piece of luggage.

12 Claims, 5 Drawing Sheets

FOREIGN PATENT DOCUMENTS

| | | |
|---|---|---|
| FR | 2 639 432 | 5/1990 |
| GB | 1 308 915 | 3/1973 |
| JP | 11-169219 | 6/1999 |
| WO | WO 98/59223 | 12/1998 |

* cited by examiner

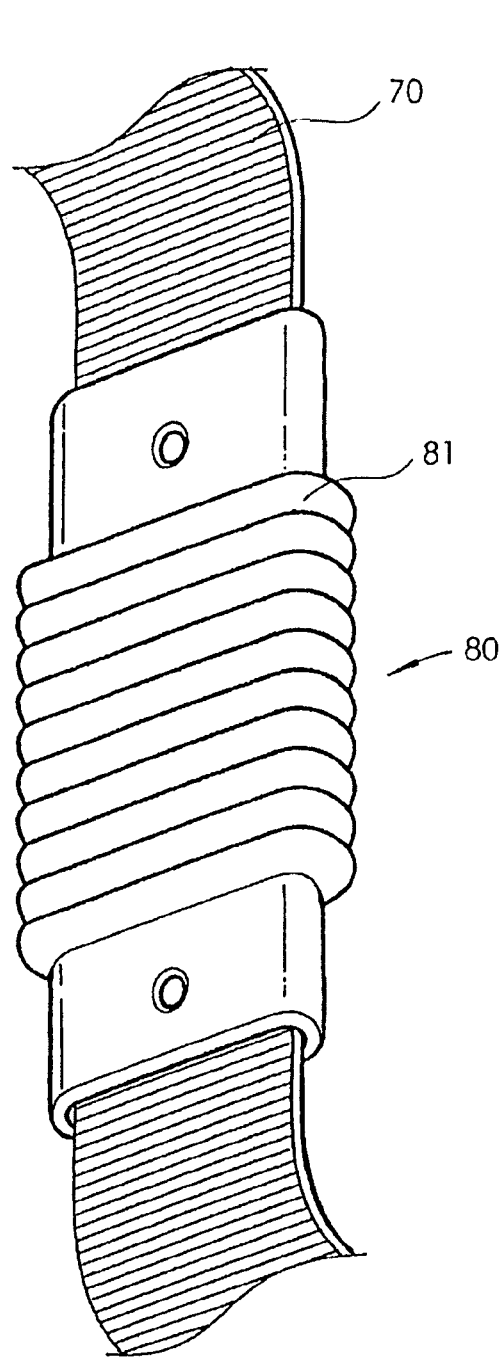 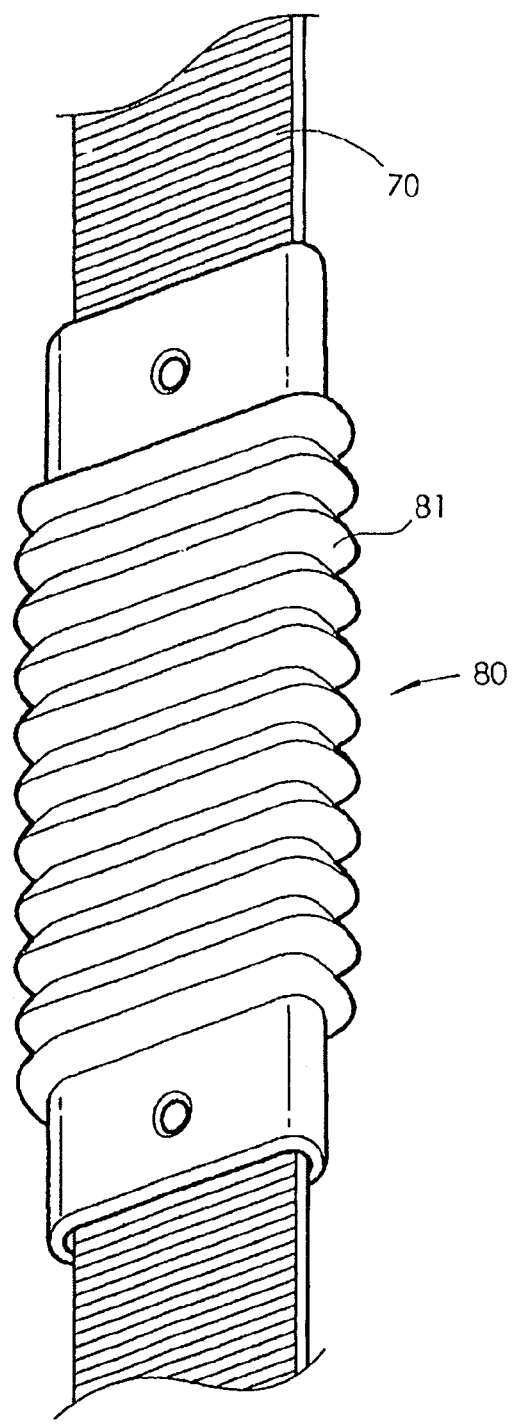
*Fig. 4a*  *Fig. 4b*

WEIGHING DEVICES

FIELD OF THE INVENTION

This invention relates to weighing devices and in particular relates to devices that provide a ready indication of the weight of a piece of luggage.

BACKGROUND OF THE INVENTION

Commercial aircraft have to place strict controls on the amount and weight of luggage that passengers carry on the aircraft. Tourists and international travelers often experience difficulties in ascertaining the weight of their luggage and this can result in fines and surcharges for being overweight. Whilst the check-in counters have scales that accurately weigh luggage it is often then too late for a passenger to re-organise his or her luggage. What is needed and what is apparently absent from the marketplace today is a simple means of providing an indication of the weight of a piece of luggage so that passengers can determine the weight of the luggage before they reach the airport.

The issue of overweight luggage also has serious ramifications with regard to health and safety considerations. Heavy suitcases, rucksacks or satchels can cause serious spinal injuries. Research has indicated that children, and/or adults, should not over lengthy periods transport more than 10% of their weight. In Australia there is a common practice for school children to carry their text books, exercise books and even laptops in satchels or rucksacks. Often very small and frail children end up carrying loads far in excess of those recommended by the medical profession. Parents and staff of schools and other educational establishments need a ready indication of when a child is lifting or transporting overweight luggage.

It is these needs that have brought about the present invention.

SUMMARY OF THE INVENTION

According to one aspect of the present invention there is provided a rucksack or backpack having a pair of spaced shoulder straps, at least one strap having stress/strain means to monitor the stress/strain in the strap as the rucksack or backpack is worn on the shoulder of a user, and the at least one strap having indicator means that provides a visual indication when the stress/strain of the strap has exceeded a predetermined threshold.

According to a further aspect of the present invention there is provided a weighing device for providing a ready indication of the weight of a rucksack or backpack, the device comprising load bearing means adapted to be placed on or form part of a shoulder strap of the rucksack or backpack, the load bearing means comprising an elastic strip attached parallel to an undulating portion of the strap, the elastic strip comprising concertina bellows secured to surround the undulating portion of the strip whereby the external configuration of the bellows change as the strip stretches under load to provide a visual indication of the weight of the rucksack or backpack.

DESCRIPTION OF THE DRAWINGS

Embodiments of the present invention will now be described by way of example only with reference to the accompanying drawings in which:

FIGS. 4a and 4b are perspective views of a weighting device in accordance with another embodiment in a loaded and unloaded configuration.

DESCRIPTION OF THE PREFERRED EMBODIMENTS

The invention is applicable to rucksacks or satchels especially those used by school children to carry their text books and laptops. The common practice of school children transporting excessively heavy loads in satchels and/or rucksacks is well known. The embodiments of FIGS. 1 to 5 provide a means that provides a ready indication that the load is too great.

Figure 1:
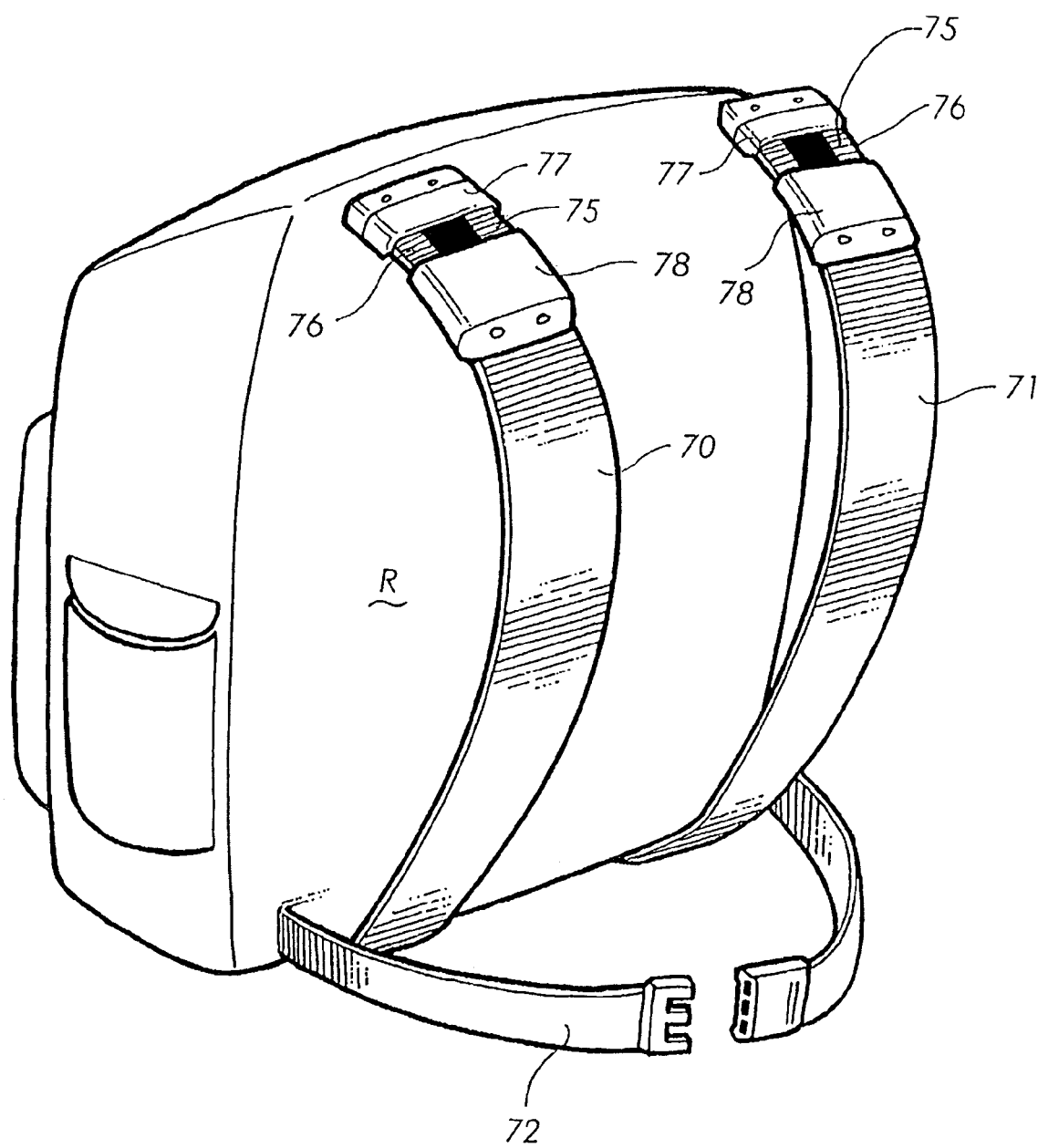
FIG. 1 is a perspective view of a school satchel or rucksack incorporating a weighting device.
Figures 2A, 2B, 2C:
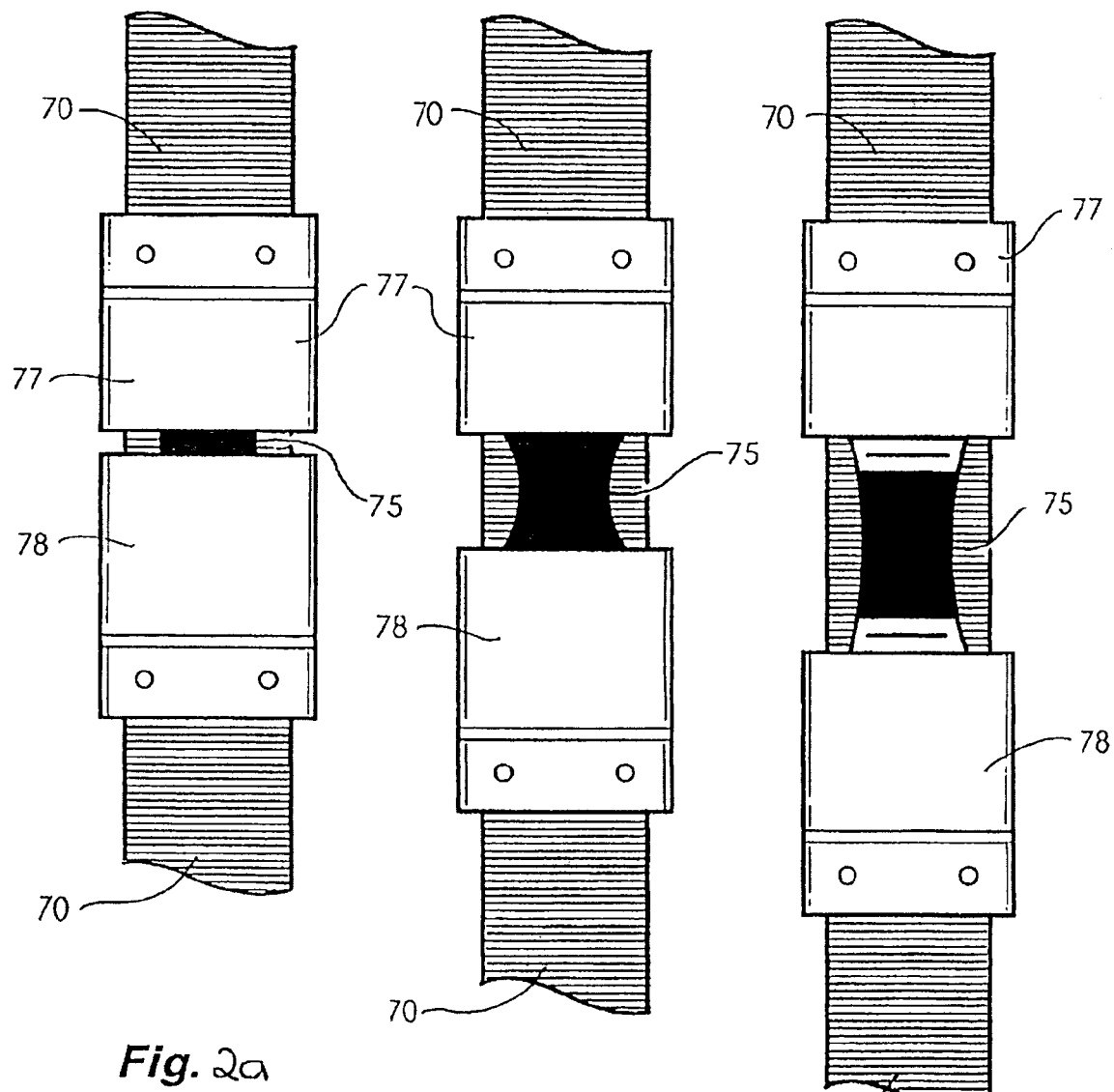
FIGS. 2a, 2b and 2c show the device of FIG. 1 in various loaded configurations.
Figure 3A:
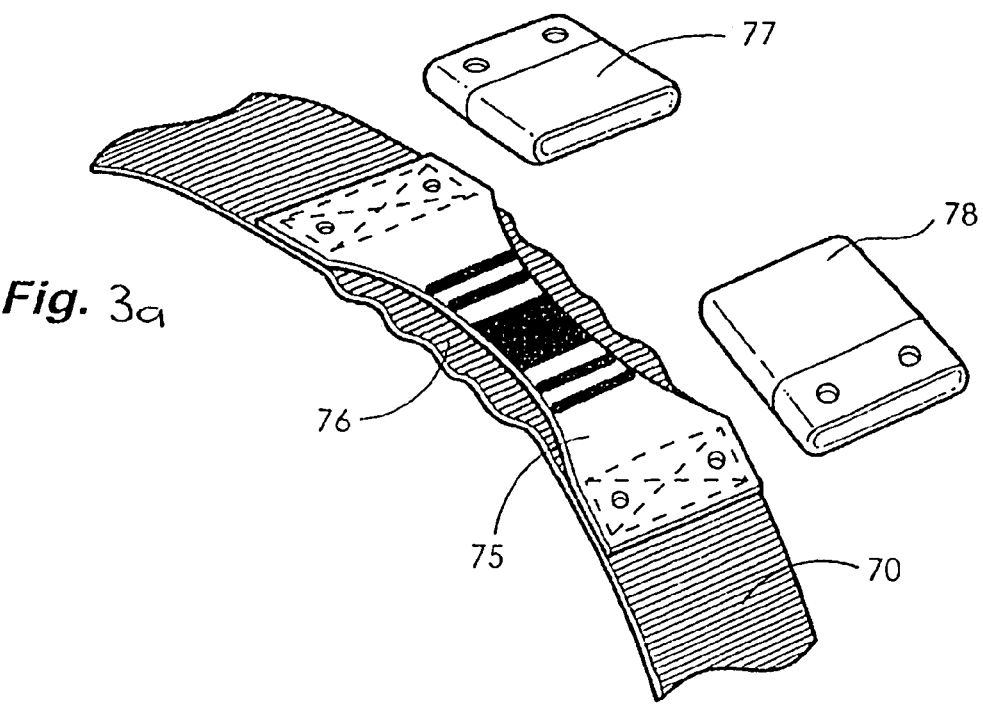
FIGS. 3a and 3b are exploded views of the device in unloaded and loaded configurations.
Figure 3B:
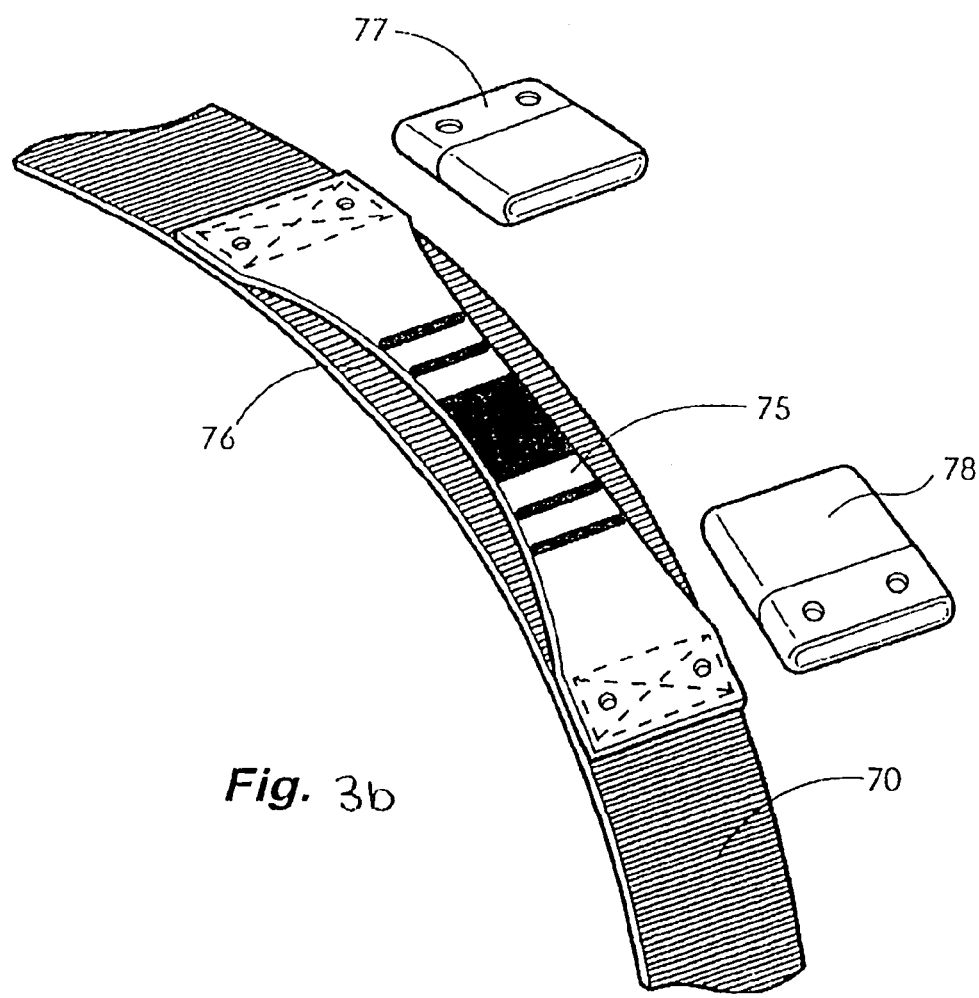

The first embodiment is illustrated in FIGS. 1 to 3. FIG. 1 shows a rucksack R that is supported by parallel shoulder straps 70, 71 and a waist strap 72. As shown in FIG. 3a and 3b, a resilient strip 75 of rubber or plastics is secured by stitching, welding or riveting in parallel along a length 76 of the strap 70 or 71 with the strap as shown in FIG. 3a when unloaded, being in an unstressed slightly undulating configuration. When the strap 70 or 71 is placed under load the resilient member 75 stretches to absorb the slack in the strap as shown in FIG. 3b. A cover 77, 78 is supported on each end of the resilient member 75 to assume a substantially closed configuration when the strap 70, 71 is not under load as shown in FIG. 2a, a partially expanded configuration when the strap 70, 71 is under partial load as shown in FIG. 2b, and a fully expanded configuration when the strap 70, 71 is under maximum load shown in FIG. 2c. The resilient strap 75 would be coloured or otherwise marked as shown in the drawings so that as the load increases there is a ready visual indication of that load which could be either caused by a flash of colour or a visible scale or warning sign that would warn a parent or teacher that the rucksack is carrying excessive weight. Thus, for instance, the resilient member 75 would be calibrated so that the desired comfortable weight as shown in FIG. 2a, a slightly excessive weight, whilst still permissible, is shown in FIG. 2b and impermissible excessive weight is shown in FIG. 2c. This feature could be on a single strap 70 or preferably on both straps 70, 71 as shown in the view of the rucksack R in FIG. 1.

Figure 5A:
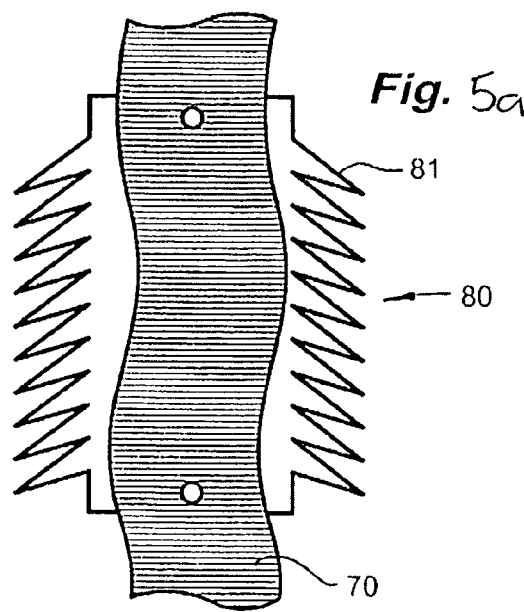
FIGS. 5a, 5b and 5c are exploded views of the device in an unloaded, partially loaded and fully loaded configuration.
Figure 5B:
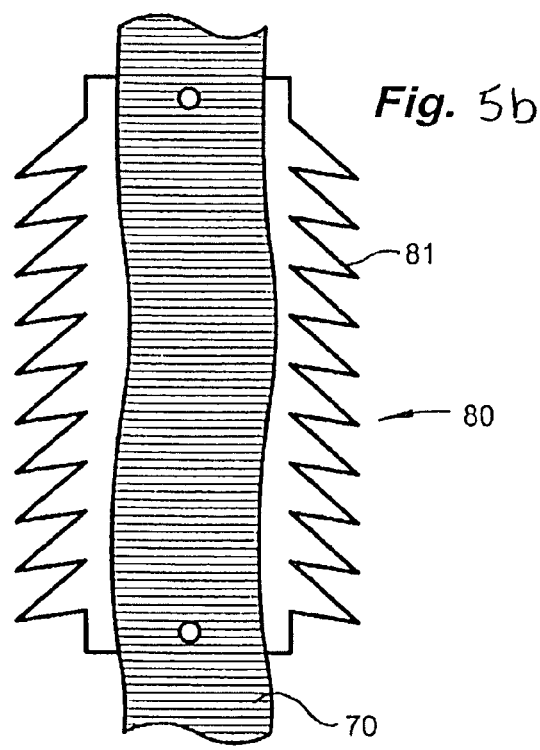
Figure 5C:
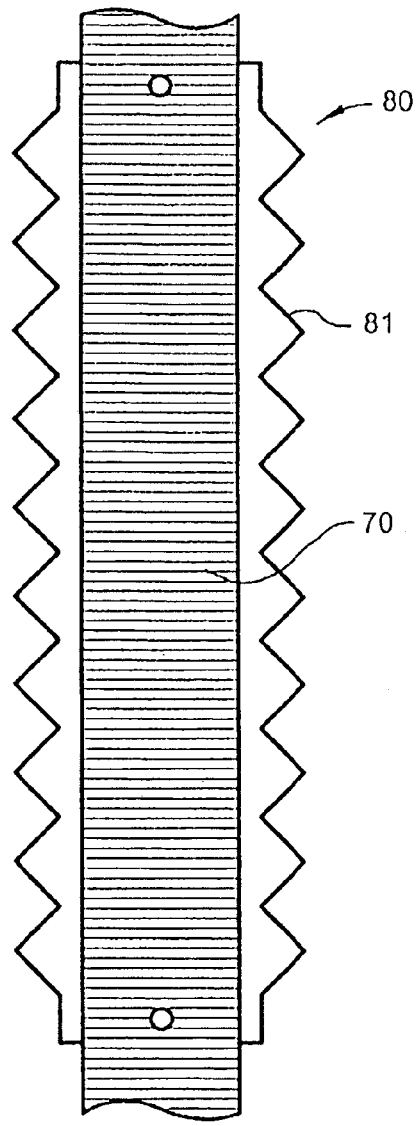

In another embodiment on the same theme shown in FIGS. 4 and 5, a concertina enclosure 80 having a series of parallel bellows 81 is attached to the strap 70 or 71 to assume, in an unloaded configuration, the view in FIGS. 4a and 5a that is with the strap in an unstressed and undulating configuration. As a load is placed on the strap the elongate strap expands the bellows 81 to assume a different configuration shown in FIG. 5b. When fully under load the strap assumes the stretched configuration shown in FIG. 5c which further expands the concertina bellows 81 to assume the profile shown in FIG. 4b.

The bellows 81 can be painted in a manner that vivid colours only become visible as the bellows expand so that in the fully expanded view shown in FIG. 5a there may be a large red flash along the length of the bellows which would provide a ready indication that the strap 70, 71 is under excessive load.

It is understood that other more sophisticated means can be incorporated into devices of the kind described above such as the use of strain gauges or load cells and indicator means that provide coloured lights or digital indication of the exact weight of a rucksack or satchel. However, a simple mechanical mechanism with a visual indicator is viewed as the most practical and cost effect means of solving what is becoming an increasing problem that can result in serious spinal injuries to young children.

The claims defining the invention are as follows:

1. A weighing device for providing a ready indication of the weight of a rucksack or backpack, the device comprising load bearing means adapted to be placed on or form part of a shoulder strap of the rucksack or backpack, the load bearing means comprising an elastic strip attached parallel to an undulating portion of the strap, the elastic strip comprising concertina bellows secured to surround the undulating portion of the strip whereby the external configuration of the bellows changes as the strip stretches under load to provide a visual indication of the weight of the rucksack or backpack.

2. The weighing device according to claim 1 wherein the bellows are colored in a manner that colors are exposed as the bellows changes configuration on stretching.

3. A rucksack or backpack having a pair of spaced shoulder straps, at least one strap having stress/strain means to monitor the stress/strain in the strap as the rucksack or backpack is worn on the shoulder of a user, and the at least one strap having indicator means that provides a visual indication when the stress/strain of the strap has exceeded a predetermined threshold, wherein the stress/strain means comprises an elastic portion of the strap, and wherein the indicator means constitutes part of the elastic portion of the strap that becomes exposed to provide a visual indication of the stress/strain means being stretched under load.

4. A rucksack or backpack having a pair of spaced shoulder straps, at least one strap having stress/strain means to monitor the stress/strain in the strap as the rucksack or backpack is worn on the shoulder of a user, and the at least one strap having indicator means that provides a visual indication when the stress/strain of the strap has exceeded a predetermined threshold, wherein the stress/strain means comprises an elastic strip attached parallel to an undulating portion of the strap.

5. The rucksack or backpack according to claim 3, wherein the elastic portion is covered from each end, the cover separating under load to expose the indicator means.

6. The rucksack or backpack according to claim 4, wherein the indicator means constitutes part of the elastic strip that becomes exposed to provide a visual indication of the stress/strain means being stretched under load.

7. The rucksack or backpack according to claim 4, wherein the elastic strip comprises concertina bellows secured to surround an undulating portion of the strap whereby the external configuration of the bellows change as the strip stretches under load.

8. The rucksack or backpack according to claim 7, wherein the bellows are colored in a manner that the colors are exposed as the bellows change configuration on stretching.

9. The rucksack or backpack of claim 3, wherein the stress/strain means and indicator means are provided in both shoulder straps.

10. A rucksack or backpack having a pair of spaced shoulder straps, at least one strap having stress/strain means to monitor the stress/strain in the strap as the rucksack or backpack is worn on the shoulder of a user, and the at least one strap having indicator means that provides a visual indication when the stress/strain of the strap has exceeded a predetermined threshold, wherein the stress/strain means comprises a strain gauge that is electrically coupled to a liquid crystal display to provide a visual indication of the load on the strap or carry means.

11. The rucksack or backpack of claim 4, wherein the stress/strain means and indicator means are provided in both shoulder straps.

12. The rucksack or backpack of claim 10, wherein the stress/strain means and indicator means are provided in both shoulder straps.

* * * * *